(12) United States Patent
Wakita et al.

(10) Patent No.: US 7,236,663 B2
(45) Date of Patent: Jun. 26, 2007

(54) DISPLAY ELEMENT AND DISPLAY DEVICE USING THE SAME

(75) Inventors: Naohide Wakita, Suita (JP); Seiji Nishiyama, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/533,663

(22) PCT Filed: Nov. 4, 2003

(86) PCT No.: PCT/JP03/14047

§ 371 (c)(1),
(2), (4) Date: May 3, 2005

(87) PCT Pub. No.: WO2004/042449

PCT Pub. Date: May 21, 2004

(65) Prior Publication Data

US 2006/0034566 A1 Feb. 16, 2006

(30) Foreign Application Priority Data

Nov. 5, 2002 (JP) .............................. 2002-320895
May 9, 2003 (JP) .............................. 2003-131340

(51) Int. Cl.
*G02B 6/26* (2006.01)
*G02B 6/35* (2006.01)

(52) U.S. Cl. .............................. 385/31; 385/4; 385/25; 385/40

(58) Field of Classification Search ............... None

See application file for complete search history.

(56) References Cited

U.S. PATENT DOCUMENTS

| 3,612,758 | A | * | 10/1971 | Evans et al. ................. 348/803 |
| 4,106,848 | A | * | 8/1978 | Conwell et al. ............... 385/4 |
| 4,128,299 | A | * | 12/1978 | Maher .......................... 385/4 |
| 4,218,302 | A | | 8/1980 | Dalisa et al. |
| 4,529,789 | A | * | 7/1985 | Kroupa ......................... 528/15 |
| 4,708,914 | A | * | 11/1987 | Kamijo ........................ 428/690 |
| 5,106,181 | A | | 4/1992 | Rockwell, III |
| 5,367,585 | A | * | 11/1994 | Ghezzo et al. ................ 385/23 |
| 5,636,072 | A | | 6/1997 | Shibata et al. |
| 5,771,321 | A | * | 6/1998 | Stern ........................... 385/31 |
| 6,369,867 | B1 | * | 4/2002 | Ge ............................... 349/73 |
| 6,381,381 | B1 | | 4/2002 | Takeda et al. |
| 6,642,913 | B1 | * | 11/2003 | Kimura et al. ................. 345/84 |
| 6,912,082 | B1 | * | 6/2005 | Lu et al. ...................... 359/295 |

FOREIGN PATENT DOCUMENTS

| EP | 1 245 988 | 10/2002 |
| JP | 54-142089 | 11/1979 |
| JP | 7-287176 | 10/1995 |
| JP | 11-202222 | 7/1999 |

OTHER PUBLICATIONS

Zhou, et al., "Waveguide Panel Display Using Electromechanical Spatial Modulators", SID 98 Digest, pp. 1022-1025, 1998.

\* cited by examiner

*Primary Examiner*—Rodney Bovernick
*Assistant Examiner*—Omar Rojas
(74) *Attorney, Agent, or Firm*—Hamre, Schumann, Mueller & Larson, P.C.

(57) ABSTRACT

A display element is provided with a light source and a waveguide that propagates a light emitted from the light source, wherein the light propagated in the waveguide is extracted to outside from a waveguide lateral face, and wherein the light is extracted out of the waveguide from the waveguide lateral face by changing a shape of the waveguide lateral face.

5 Claims, 8 Drawing Sheets

DISPLAY ELEMENT AND DISPLAY DEVICE USING THE SAME

TECHNICAL FIELD

The present invention relates to display elements and display devices using these display elements in which display is carried out by extracting light propagated by a waveguide from a lateral face of the waveguide.

BACKGROUND ART

Display devices in which light propagated by a waveguide is extracted from a lateral face of the waveguide are disclosed in JP H7-287176A (particularly pages 6-7 and FIGS. 1 to 20) and JP H11-202222A (particularly pages 3-4, paragraph (0010), and FIG. 2) for example. These display devices are provided with actuator portions that are connected to light extraction portions and made of a ceramic piezoelectric film. Rest and displacement of the actuator portion is carried out by applying a voltage to the actuator portion such that the light extraction portion comes in contact with or moves away from the light waveguide, thereby extracting leakage light in a controlled manner.

Display devices that use the above system have been implemented as large size display panels. A commercialized example of these is presented in a CeramVision/CeramBoard brochure (fifth page, lower left column) at the following Internet address: http://www.ngk.co.jp/ELE/product/07/index.html (accessed on Jul. 25, 2002).

With traditional displays, light that is totally reflected and propagated within the waveguide is made to leak to the outside from a lateral face of the waveguide by bringing the waveguide and the light extraction portion together to a distance less than the wavelength of the light. That is, so called evanescent waves are extracted (particularly see paragraph (0009) of JP H7-287176A and claim 1 of JP H11-202222A). As shown in drawings such as FIGS. 1 and 4 of JP H7-287176A, the extraction of light from a lateral face of the waveguide is controlled by whether or not a flat surface of a displacement transmission portion (light extraction portion) is made to come into contact with a planar waveguide.

Furthermore, FIG. 3 of JP H11-202222A shows the transmissivity of light when evanescent light of light that is totally reflected by a total reflection surface is extracted at an extraction surface that has been brought in to proximity with the total reflection surface. According to this, transmissivity of approximately 50% is shown for light that has an incident angle in the range of 50° to 80° to the total reflection surface when the distance between the total reflection surface and the extraction surface is in the range of 0.1 to 0.05 μm.

Furthermore, for example, a display device is disclosed in "Waveguide Panel Display Using Electromechanical Spatial Modulators," X. Zhou, E. Gulari, SID98 Digest, 1998, pages 1,022 to 1,025, in which an electrostatic actuator, in which a metal electrode film is formed on a polyimide film, is used as the actuator portion and an LED is used as the light source. In this display device, in contrast to the light extraction portion's width of 0.23 mm, the thickness of the waveguide is 0.5 mm. Furthermore, a surface of the waveguide is an ITO film, and the surface of the light extraction portion that comes into contact with the ITO film is made by forming a film doped with titanium dioxide particles, which affect the diffusion properties of the polyimide, on an electrode, such that this film becomes a composite material harder than polyimide.

The above-described conventional display device has low efficiency in extracting from the waveguide the light that is propagated in the waveguide. Moreover, unless the light extraction portion exerts a large pressure on the waveguide, the extracted light has insufficient brightness and is uneven.

DISCLOSURE OF INVENTION

The present invention has been devised to solve these issues, and it is an object thereof to provide a display element and a display device in which light propagated in a waveguide can be extracted with high efficiency from a lateral face of the waveguide.

A display element according to the present invention is provided with a light source and a waveguide that propagates a light emitted from the light source, wherein the light propagated in the waveguide is extracted to the outside from a waveguide lateral face, and wherein the light is extracted out of the waveguide from the waveguide lateral face by changing a shape of the waveguide lateral face.

BEST MODE FOR CARRYING OUT THE INVENTION

Figure 1:
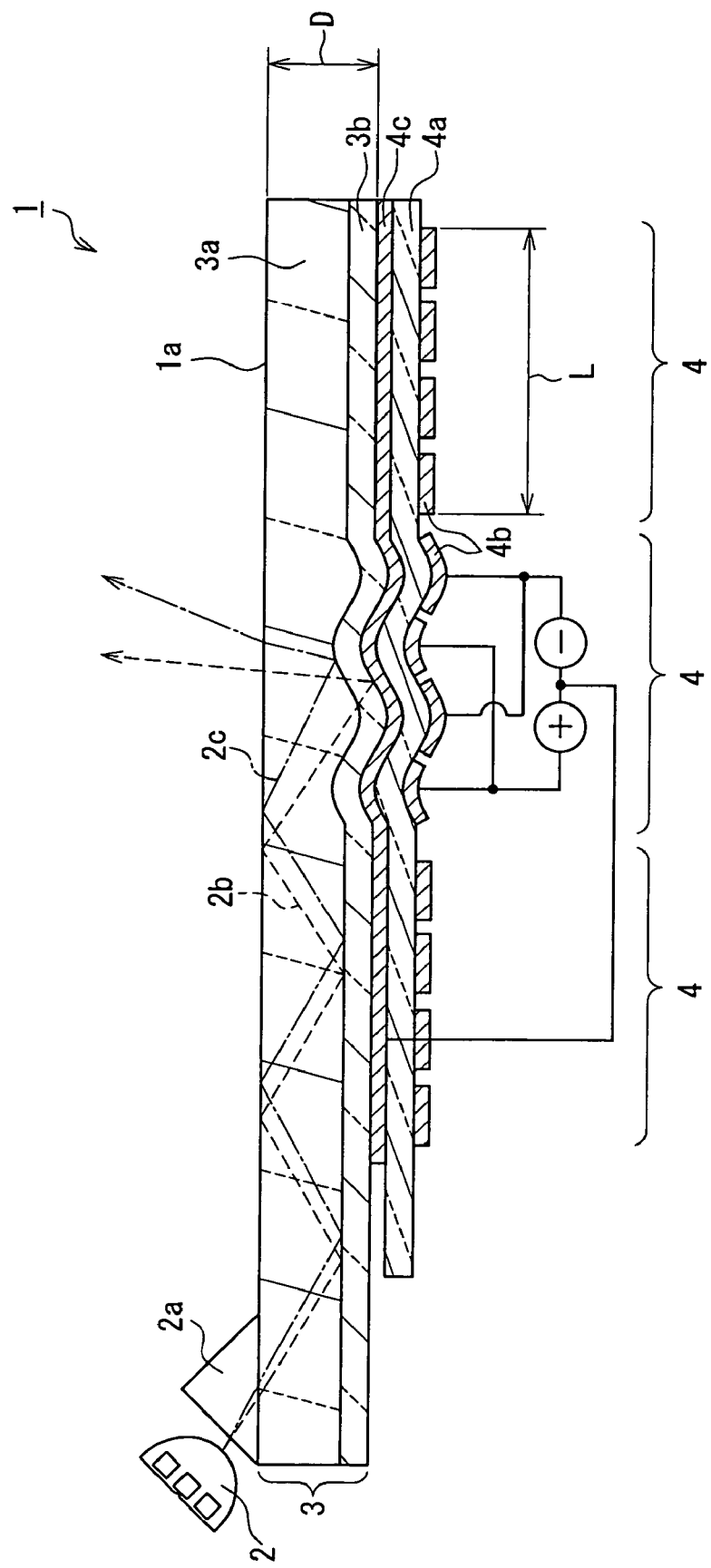
FIG. 1 is a cross-sectional view showing a structure of a display element according to Embodiment 1 of the present invention.

A display element according to the present invention extracts, from a lateral face of a waveguide, light that is propagated in the waveguide by changing the shape of the waveguide lateral face, and therefore is capable of extracting propagated light with high efficiency. This makes possible a display that is bright and uniform.

Furthermore, it is preferable that the display element is further provided with a plurality of actuators that change a shape of the waveguide, wherein the shape of the waveguide lateral face is changed by selectively operating the actuators to extract the light out of the waveguide from the waveguide lateral face. In this way, light propagated in the waveguide can be extracted with high efficiency.

Furthermore, it is preferable that the waveguide is provided with a core and a cladding formed along one lateral face of the core, wherein the actuators are attached to the cladding and a shape of the waveguide lateral face is changed by deforming the actuators. In this way, light propagated in the waveguide can be extracted with high efficiency.

Furthermore, it is preferable that the light is extracted out of the waveguide by deforming at least a portion of the core of the waveguide. In this way, light can be extracted precisely.

Furthermore, it is preferable that the actuators are attached to the waveguide lateral face, and a shape of the waveguide lateral face is changed by deforming the actuators. In this way, light can be extracted easily.

Furthermore, it is preferable that the actuators are provided with a piezoelectric element, and a shape of the waveguide lateral face is changed by deforming the piezoelectric element by applying a voltage to the piezoelectric element. In this way, actuators that operate at high speed can be formed and therefore high precision video display can be supported.

Furthermore, it is preferable that the actuators are provided with a first electrode film arranged at the waveguide lateral face, a piezoelectric element layered on the electrode film, and a second electrode film layered on the piezoelectric element, wherein the shape of the waveguide lateral face is changed by deforming the piezoelectric element by applying a voltage between the first electrode film arranged at the waveguide lateral face and the second electrode film layered on the piezoelectric element. In this way, high efficiency light extraction can be achieved with small external pressure.

Furthermore, it is preferable that the actuators are provided with a convex portion, and a shape of the waveguide lateral face is changed by applying pressure to the waveguide lateral face with the convex portion. In this way, high efficiency light extraction can be achieved easily.

Furthermore, the actuators are provided with: an electrode film arranged at the waveguide lateral face, and an external electrode film that is in opposition to and adjacent to the waveguide, wherein the shape of the waveguide lateral face is changed by an electrostatic force produced by applying a voltage between the external electrode film and the electrode film. In this way, high efficiency light extraction can be achieved easily.

The external electrode film is provided with a convex portion at the waveguide lateral face, and a shape of the waveguide lateral face is changed by the convex portion of the external electrode film applying pressure to the waveguide lateral face by using the electrostatic force. In this way, actuators that operate at high speed can be formed and therefore high precision video display can be supported.

Furthermore, it is preferable that the light is extracted out of the waveguide by deforming at least a portion of the core of the waveguide. In this way, light can be extracted precisely.

Furthermore, it is preferable that at least a portion of the waveguide is made of an elastic material. In this way, high efficiency light extraction is possible with small external pressure.

Furthermore, it is preferable that at least a portion of the waveguide is made of a transparent gel. In this way, high efficiency light extraction is possible with small external pressure.

Furthermore, it is preferable that the actuators are formed for each pixel. This makes possible a display using an active matrix.

Furthermore, it is preferable that the waveguide is provided with a waveguide electrode film on the waveguide lateral face, an opposing electrode film that opposes the waveguide electrode film, and particles arranged between the waveguide electrode film and the opposing electrode film, wherein, by applying a voltage between the waveguide electrode film and the opposing electrode film, the particles and the waveguide electrode film are brought into contact such that the light is extracted out of the waveguide from the waveguide lateral face. With such a structure, the particles and the waveguide can be integrated by bringing the particle into contact with the waveguide electrode film, and the light can be extracted out of the waveguide from the waveguide lateral face by changing the shape of the waveguide lateral face. In this way, high efficiency light extraction is possible by applying only a very uniform and small pressure.

Furthermore, it is preferable that the light is extracted out of the waveguide by deforming at least a portion of the core of the waveguide. In this way, light can be extracted precisely.

Furthermore, it is preferable that the particle is electrically charged. In this way, it is possible to control the particle with an electrostatic force and therefore control can be achieved easily.

Furthermore, it is preferable that the particle has a magnetic property. In this way, it is possible to control the particle with an electrostatic force and therefore control can be achieved easily.

Furthermore, it is preferable that a surface tension of the waveguide electrode film and a surface tension of a surface of the particles are different from each other. In this way, it is easy to cause the particles to contact the waveguide electrode film. For this reason, contact and non-contact of the particles can be controlled with a low voltage.

Furthermore, a coating material is applied to the waveguide electrode film. In this way, it is easy to cause the particles to contact the waveguide electrode film. For this reason, contact and non-contact of the particles can be controlled with a low voltage.

Furthermore, it is preferable that the waveguide electrode film and the opposing electrode film are provided for each pixel. This makes possible display using an active matrix.

Furthermore, the particle is fluorescent. In this way, it is possible to extract light of various wavelengths by varying the wavelength of the light from the light source.

Furthermore, the light source emits ultraviolet light. In this way, it is possible to achieve RGB display even when the light source is one type of LED.

Furthermore, the light source is a 3-color LED or a 3-color laser. In this way, the number of waveguides can be reduced.

Furthermore, it is preferable that the display device according to the present embodiment is provided with: the above-described display element, the light source drive circuit for driving the light source, an actuator drive circuit for driving the actuator, and a control circuit that controls the light source drive circuit and the actuator drive circuit. In this way, it is possible to achieve a display device capable of higher luminance and uniform display with lower power consumption.

Furthermore, it is preferably provided with the above-described display element, the light source drive circuit for driving the light source, a particle drive circuit for applying a voltage between the waveguide electrode film and the opposing electrode film, and a control circuit that controls the light source drive circuit and the particle drive circuit. In this way, it is possible to achieve a display device capable of higher luminance and uniform display with lower power consumption.

Furthermore, it is preferably provided with the above-described display element and an active matrix element that controls the respective actuators. This achieves a display device using an active matrix.

Furthermore, it is preferably provided with the above-described display element and an active matrix element that controls respective voltages between the waveguide electrode films and the opposing electrode films. This achieves a display device using an active matrix.

Furthermore, the active matrix elements may be a TFT or a TFD.

The following is a description of more specific examples of embodiments according to the present invention with reference to the accompanying drawings.

EMBODIMENT 1

The following is a description of a display element and a display device according to an embodiment of the present invention with reference to the accompanying drawings. FIG. 1 is a cross-sectional view showing a structure of a display element according to Embodiment 1 of the present invention. The display element 1 is provided with a light source 2, a waveguide 3 that propagates the light emitted from the light source 2, and a plurality of actuators 4 that change the form of the waveguide 3.

The waveguide 3 is provided with a core 3a, through which light propagates, and a cladding 3b. The cladding 3b is arranged along the surface on one side of the core 3a. Cladding is not arranged on the surface on the opposite side from the cladding 3b such that air acts as the cladding there. A sheet of silicone gel, which is an extremely soft material, with a thickness of 100-μm for example may be used as the core 3a, through which light propagates. A transparent fluoric polymer for example with a low refractive index may be used as the cladding 3b. The core 3a is coated with the cladding 3b to a thickness of 10 μm.

The light source 2 is arranged at an end portion of the waveguide 3 and the light source 2 is arranged with an orientation such that the light emitted from the light source 2 is coupled into the waveguide 3. It is preferable that a 3-color LED for example is used as the light source 2. The 3-color LED can have a structure in which RGB 3-color LED chips are accommodated in a single lamp, with each color independently controlled. In conventional flat panel displays using LCD or PDP, the pixels of the three RGB colors are separated in a stripe form. However, in Embodiment 1, by using a 3-color LED, the light of the three colors R, G, and B can be input to a single waveguide 3, and therefore it is possible for a single waveguide 3 to emit any of the three colors R, G, and B. It should be noted that it is preferable for a prism 2a to be placed and optically coupled at an incident location of the waveguide 3 to facilitate entrance of the light from the light source 2 even when the waveguide 3 is thin.

The actuators 4 are provided with a piezoelectric element 4a, and electrode films 4b and 4c that are arranged respectively on opposite sides of the piezoelectric element 4a. The actuators 4 are attached at a lateral face on the cladding 3b side of the waveguide 3. The piezoelectric element 4a may be polyvinylidene fluoride (PVDF) for example, on which a plurality of the electrode films 4b and the electrode film 4c are formed by applying on both sides thereof a silver paste for example. The actuators 4 are attached with an adhesive at a lateral face, that is, the cladding 3b, of the waveguide 3. The electrode films 4b have a width of 70 μm and are formed in a striped pattern with a pitch of 90 μm. It should be noted that these stripes are formed extending vertically with respect to the paper plane in FIG. 1. Four of these stripes of electrode films 4b constitute a single actuator 4. Furthermore, the electrode film 4c facing the electrode films 4b is a continuous coating that spreads uniformly on the waveguide 3 and is shared by a plurality of actuators 4.

The following is a description of how light is extracted from a lateral face of the waveguide 3 of the display element 1 shown in FIG. 1. Positive and negative voltages are alternately applied to the four stripes of electrode films 4b of the actuators 4 arranged at the waveguide 3. In this way, the piezoelectric film 4a contracts in locations of the electrode films 4b supplied with a positive voltage, and the piezoelectric film 4a lengthens in locations of the electrode films 4b supplied with a negative voltage. Since the length of the cladding 3b is prescribed and does not change, the actuators 4 alternately project up and down as shown in FIG. 1. That is, the actuators 4 become wave shaped. This makes the cladding 3b change to the same shape as the actuators 4 and the surface of the core 3a on the cladding 3b side is also deformed.

The lengths of the cladding 3b and the piezoelectric film 4a are the same when no voltage is applied, and therefore the actuators 4 assume a planar shape.

In this way, it is possible to change the form of the lateral face of the waveguide 3 by selectively controlling the voltage that is applied between the electrode films 4b and the electrode film 4c.

Light of a desired color emitted from the light source 2 is propagated in the waveguide 3. Here, when concavity and convexity are produced in desired locations on the surface of the core 3a on the cladding 3b side in the waveguide 3 by selectively applying voltages, a portion of the light propagated in the waveguide 3, for example, a light 2c shown as a dot-dash line, undergoes a change of angle with respect to the surface of the core 3a, and therefore is emitted out of the waveguide 3 from a lateral face (the side on which actuators 4 of the waveguide 3 are not arranged) of the waveguide 3 after being totally reflected. Furthermore, a light 2b, which is shown by a broken line, is transmitted through the core 3a and the cladding 3b due to the changed form of the waveguide 3 and is then reflected by the silver electrode film 4c such that it is scatter-reflected and emitted out of the waveguide 3 from a lateral face of the waveguide 3.

In this way, by controlling the application of voltages to control the color of emitted light from the light source 2 that is incident on the waveguide 3, it is possible to extract light at a desired position and of a desired color from the lateral face (display surface 1a) of the waveguide 3 of the display element 1 and carry out display.

Furthermore, the greater the voltage applied to the actuators 4, the greater the change in form of the waveguide 3. Increases in the luminance of the extracted light were observed according to measurements along with gradual increases in applied voltages starting from zero. Luminance was saturated when the voltage applied was ±30 volts and it was possible to extract 80% or more of the light from the light source 2 that was incident on the waveguide 3.

A light source 2 that provides high directivity for emitted light is preferable for extracting light efficiently. In the waveguide 3 of the display surface 1a in FIG. 1, the total reflection angle at the interface between the core 3a and the air is 60°. Accordingly, when the angle (incident angle) of the light propagated in the waveguide 3 with respect to the normal line of the display surface 1a is smaller than 41.8°, which is the critical angle, light leaks from the waveguide 3. Conversely, when the incident angle is large and the travel direction of the light is close to parallel to the waveguide 3, total reflection occurs repetitively in the core 3a and the spacing between locations of such total reflection becomes extremely large such that locations in which light extraction is desired are passed over, thus tending to reduce efficiency and produce uneven luminance.

For these reasons, it is preferable that the incident angle of light emitted from the light source 2 to the waveguide 3 is larger than the critical angle of 41.8° but close to the critical angle of 41.8° with a light of high directivity. For example, when the light source 2 is an LED, the directivity can be varied according to the shape of the lens that is molded, and therefore the half-value width of the emitted light angle distribution of the 3-color LED serving as the light source 2 was set at approximately 10°.

It should be noted that it is possible to use a light source 2 other than an LED. For example, it is possible to use a light source 2 in which directivity has been improved by arranging a micro-lens array on an organic EL panel and it is also possible to use a semiconductor laser as the light source 2.

When the waveguide 3 is too thick, the light propagated inside the waveguide 3 undergoes repetitive total reflection at the display surface 1a (the interface between the waveguide 3 and the air) and the spacing between locations of total reflection becomes extremely large. For this reason, the propagated light may pass over the arranged locations (pixels) of the actuators 4, thus bringing about light beams that cannot be extracted. Therefore, it is preferable that the waveguide 3 is not too thick.

Specifically, setting the thickness D of the waveguide 3 in FIG. 1 at not greater than ½ of the length L (the length of the actuators 4 in the propagation direction of light in the waveguide 3) of the portions of the waveguide 3 that are made to change form by the actuators 4 is preferable in terms of efficient extraction.

The thickness of the waveguide 3 is determined according to the number of pixels and the size of the display area. In the display element 1, the length L of the portions of the waveguide 3 that are made to change form by the actuators 4 corresponds to the length of one pixel in the horizontal direction (propagation direction of light in the waveguide 3). For example, the display size of a display device 100 using the display element 1 described below is that of a HDTV in the range of 60 to 100 inches. In this case for example, the size of a single pixel is approximately in the range of 230.6 µm (vertical)×691.8 µm (horizontal) to 384.3 µm (vertical)× 1,153 µm (horizontal). It should be noted that here vertical is the length in the perpendicular direction with respect to the propagation direction of length in the waveguide 3 and horizontal is the length in the propagation direction of light in the waveguide 3. The thickness D of the waveguide 3 here is preferably not less than 345.9 µm and not greater than 576.5 µm. The thickness D of the waveguide 3 is preferably not greater than ½ of the length L (the length of the actuators 4 in the propagation direction of light in the waveguide 3) of the portions of the waveguide 3 that are made to change form by the actuators 4.

On the other hand, when the waveguide 3 is too thin, the angles at which light can be propagated in the waveguide 3 are limited such that the propagated light is close to single mode, and therefore the amount of propagated light is reduced. Furthermore, it is difficult to provide incident light when the waveguide 3 is too thin. For this reason, it is preferable that the thickness of the core 3a is at least 30 µm or more.

Figure 2:
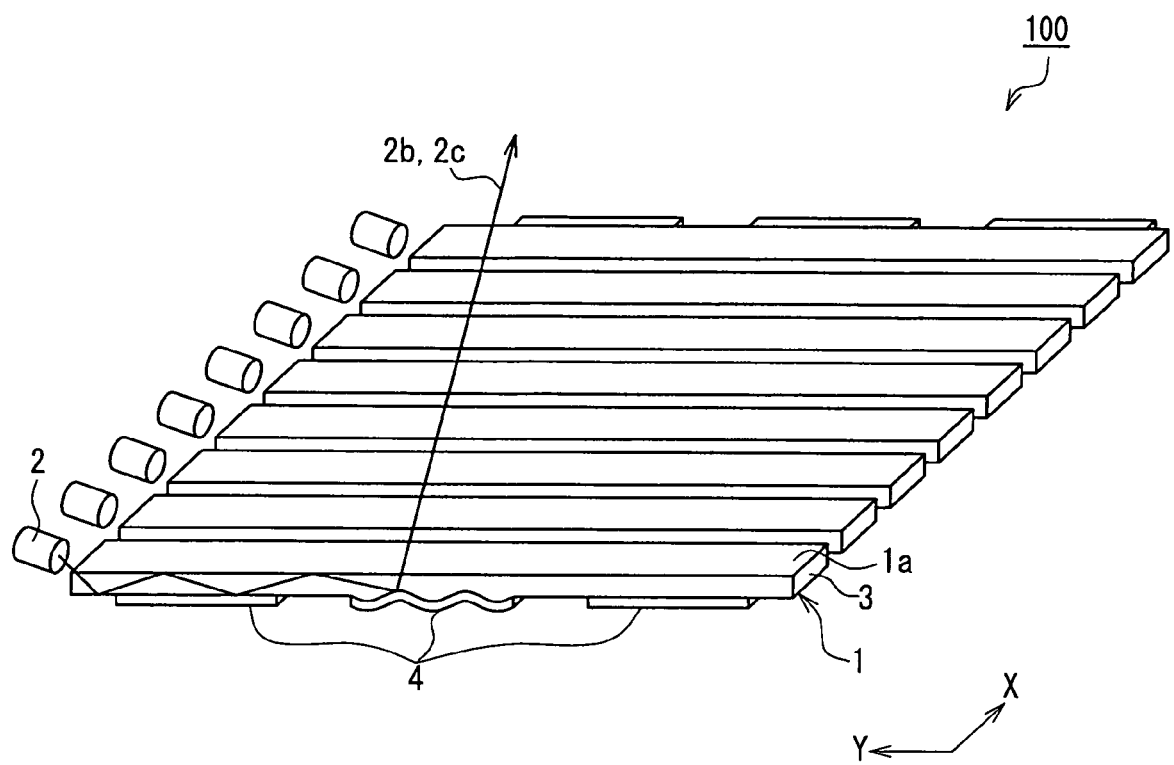
FIG. 2 is a perspective view showing a structure of a display device according to Embodiment 1 of the present invention.

The following is a description of a display device 100 according to Embodiment 1 with reference to FIG. 2. FIG. 2 is a perspective view showing a structure of the display device 100 according to Embodiment 1. With the above-described display element 1 vertical with respect to the propagation direction of light in the waveguide 3, the display device 100 can be configured by arranging in a row a plurality of the display elements 1 such that the display surfaces 1a are on the same side. As shown in FIG. 2, with the display device 100 of Embodiment 1, the waveguides 3 of the display elements 1 are arranged in an array of n rows in the row direction (X direction) of the screen. Here, n is a natural number. The respective light sources 2 are arranged at end portions of the waveguides 3 and actuators 4 for m lines are arranged in a line direction (Y direction), which is the direction in which waveguides 3 extend. The number of pixels of the display device 100 is n×m pixels.

A display device 100 according to Embodiment 1 operates the actuators 4 in line sequence to change the form of the lateral face of the waveguide 3 and thereby change the direction in which light conveyed in the waveguide 3 by total reflection is reflected, thus extracting light from within the waveguide 3 and causing the light emission from the display surface 1a.

A display device 100 with this configuration is capable of displaying a given image by controlling the application of voltages to the various chips for the 3-color LEDs serving as the light sources 2 for the waveguides 3 that extend in the row direction of the display plane (XY plane), based on the color and luminance information of the pixels on the lines for which extraction is selected with the electrode films 4b and the electrode film 4c.

Figure 3:
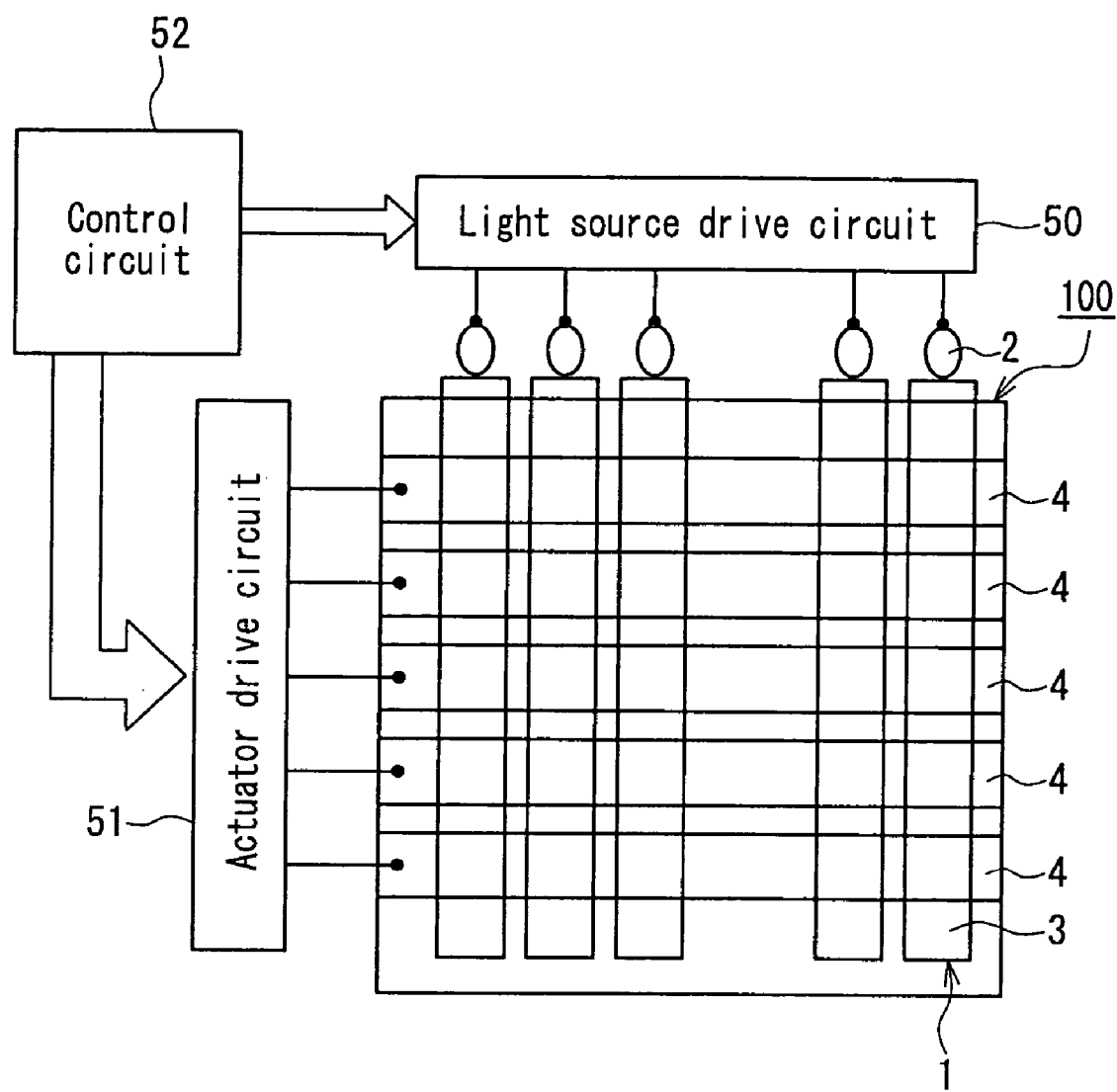
FIG. 3 is a block diagram showing a structure of a display device according to Embodiment 1 of the present invention.

A block diagram showing a configuration of the display device 100 of Embodiment 1 is shown in FIG. 3. FIG. 3 illustrates a specific configuration for actually operating the display device 100. In addition to the above, the display device 100 is provided with a light source drive circuit 50 for driving the light sources 2, an actuator drive circuit 51 for driving the actuators 4 by applying voltages to the electrode film 4b and 4c, and a control circuit 52 that synchronizes these circuits, inputs signals, and displays images. The control circuit 52 inputs luminance information of the colors RGB of pixels in lines selected by the actuator drive circuit 51 to the driver LSI of the light source drive circuit 50, and the light source drive circuit 50 inputs applied voltages corresponding to the luminance information to the light sources 2 to enable full color image display.

Since 3-color LEDs are used as the light sources 2, it is possible to make light of three colors incident on a single waveguide 3. This makes it possible to display light of three colors with a single display element 1, that is, with one line. With conventional display devices such as liquid crystal displays and PDPs, a pixel is configured by three sub-pixels of the three primary colors R, G, and B. However, with the display device using the waveguide 3 of Embodiment 1, it is not necessary to divide the waveguides 3 that extend in the row direction for each color and the three primary colors can be incident on a single waveguide 3, and therefore it is possible to reduce the number of waveguides 3 (display elements 1), thus providing the effect of reduced costs.

Uniformly bright planar display could be confirmed by sequentially applying voltages of ±30V to the actuators 4 in the display elements 1 of the display device 100. With conventional structures in which light is extracted using evanescent waves, it has not been possible to reduce to zero the distance between the waveguide and the light extraction surface due to the influence of submicron size particulates that exist in multitude even in clean rooms. For this reason, it has not been easy to achieve high extraction efficiency even when pressing the light extraction surface against the waveguide with considerable force.

However, with the display elements 1 of the display device 100 of Embodiment 1, by using soft waveguides, light is extracted by causing the waveguides to change form with small external force, thus changing the reflection direction of light propagated in the waveguides. For this reason, it was possible to achieve a higher extraction efficiency than using extraction of evanescent waves.

Furthermore, high speed operation is possible since piezoelectric elements are used in the actuators 4. For this reason, high-speed scanning is possible, thus also supporting high-definition image display.

EMBODIMENT 2

Figure 4:
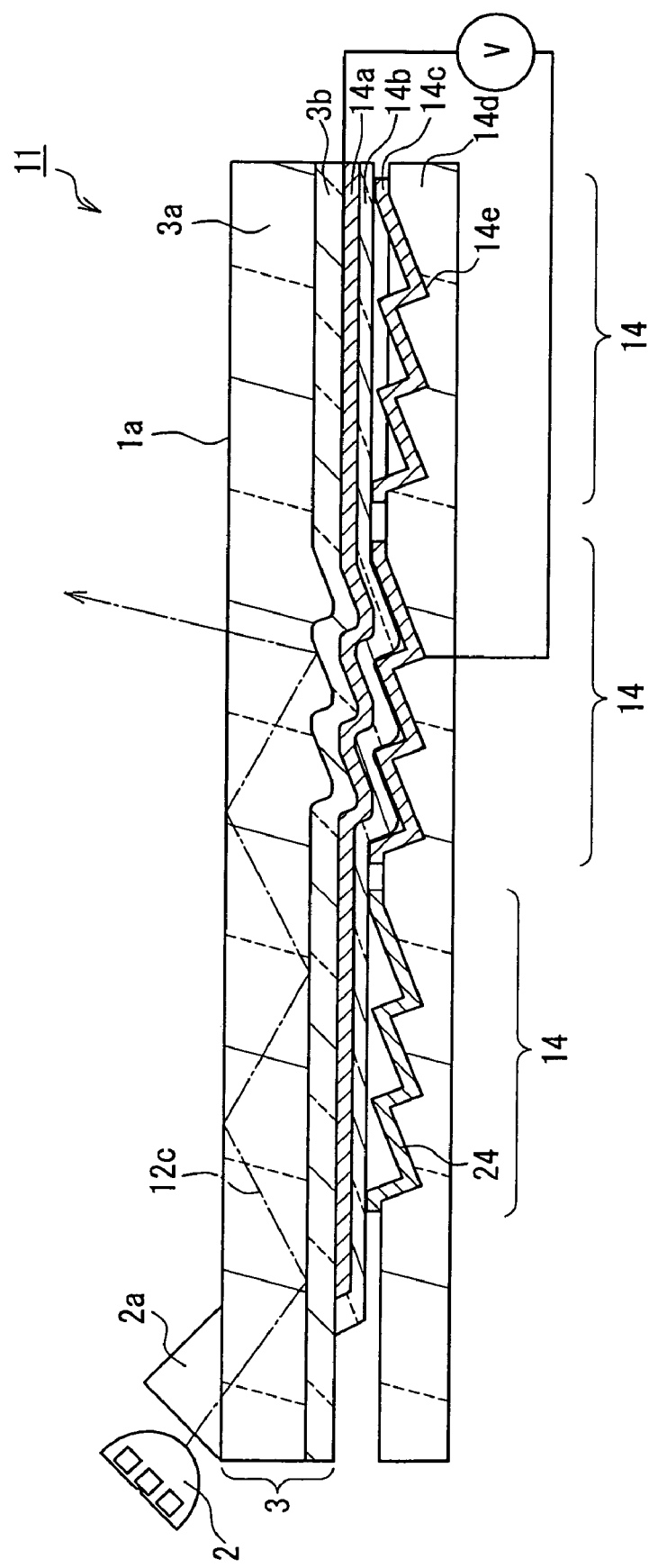
FIG. 4 is a cross-sectional view showing a structure of a display element according to Embodiment 2 of the present invention.

The following is a description of a display element 11 according to Embodiment 2 of the present invention with reference to FIG. 4. In the display element 11 of Embodiment 2 and the display element 1 of Embodiment 1, the actuators are different. Other than that the structure is substantially the same and therefore members having the same function will be given the same numerical symbol and description thereof will be omitted.

As shown in FIG. 4, the display element 11 of Embodiment 2 is provided with a light source 2, a waveguide 3 that propagates the light emitted from the light source 2, and actuators 14 that change the form of the waveguide 3. The light source 2 and the waveguide 3 are the same as in the display element 1 of Embodiment 1. The light source 2 is a 3-color LED for example, and the light emitted by the light source 2 propagates in the waveguide 3. The waveguide 3 is provided with a core 3a and a cladding 3b, and since the core 3a is exposed on the opposite side of the cladding 3b, the air acts as cladding. It should be noted that in Embodiment 2, the core 3a is a flat sheet of a 100 µm thickness and is made of a silicone gel material, while the cladding 3b is a transparent fluoric resin with a film thickness of 5 µm.

The actuators 14 are provided with an electrode film 14a arranged on a lateral face of the waveguide 3, a polycarbonate insulation thin film 14b of a thickness of 0.1 µm for example that is applied to the electrode film 14a, a substrate 14d made of 0.15 mm thick PET film arranged in opposition to the insulation thin film 14b, and external electrode films 14c, which are formed on the substrate 14d on the insulation thin film 14b side and have a concavo-convex shape. There are a plurality of the concavo-convex shaped external electrode films 14c on the substrate 14d, and a single actuator 14 is configured for each external electrode film 14c. The electrode film 14a is formed on the entire surface of the waveguide 3 (cladding 3b) and is common with respect to the actuators 14.

A method for manufacturing the above-described waveguide 3 and the actuators 14 is to coat the cladding 3b on the core 3a for example, then further apply a silver paste with screen printing for example on the surface of the cladding 3b to form the electrode film 14a. Further still, a polycarbonate is applied to the electrode film 14a to form the insulation thin film 14b. Then, an indented concavo-convex portion 14e is formed by being pressed formed in a striped pattern on the surface of the substrate 14d, which is made of a 0.15 mm thick PET film. The concavo-convex portion 14e has a cross-sectional depth of 3 µm for example and a pitch of 30 µm. The aluminum external electrode films 14c are formed on the concavo-convex portion 14e by carrying out aluminum deposition for example. Finally, the substrate 14d and the waveguide 3 are arranged so as to oppose each other.

The following is a description of the operation of the thus-structured display element 11.

When no voltage is applied between the electrode film 14a and the external electrode films 14c, only the convex portions of the concavo-convex shaped external electrode films 14c and the insulation thin film 14b are connected at the end portions of the display element 11 shown in FIG. 4. For this reason, the lateral face of the waveguide 3 is flat. However, by applying a voltage between the electrode film 14a and the external electrode films 14c, an electrostatic force is produced therebetween such that these are attracted to each other. Due to this, as shown in the central area of the display element 11 shown in FIG. 4, the electrode film 14a and the external electrode film 14c cling toward each other and the electrode film 14a and the external electrode film 14c are deformed to the same concavo-convex shape. Furthermore, the electrode film 14a is adhering to the waveguide 3, and therefore the cladding 3b and the surface of the core 3a are deformed to the same concavo-convex shape as the external electrode films 14c. That is, the lateral face of the waveguide 3 changes shape. It should be noted that the core 3a is particularly soft and therefore changes shape greatly. In this way, light that is being propagated while being totally reflected in the waveguide 3 can be extracted to the outside from the lateral face of the waveguide 3. As in Embodiment 1, a light 12c that is being propagated while being totally reflected in the waveguide 3 by the surfaces of the core 3a can be leaked to the outside from the lateral face of the waveguide 3 by deforming the lateral face on one side of the waveguide 3.

That is, when desired locations of the surface of the core 3a are made to deform to a concavo-convex shape, of the light that has been propagated in the waveguide 3, the light 12c shown by the one-dot dash line for example, is emitted out of the waveguide 3 from the lateral face (the side on which the actuators 4 of the waveguide 3 are not arranged) of the waveguide 3 after being totally reflected since the angle of the surface of the core 3a changes. Furthermore, there is also light for example that penetrates the core 3a and the cladding 3b and is then reflected by the silver electrode film 14a such that it is scatter-reflected and emitted out of the waveguide 3 from a lateral face of the waveguide 3.

In this way, by controlling the application of voltages to control the color of emitted light from the light source 2 that is incident on the waveguide 3, it is possible to extract light at a desired position and of a desired color from the lateral face (display surface 1a) of the waveguide 3 of the display element 1 and carry out display.

When sequential line scanning actually is carried out by introducing incident light to the waveguide 3 from the 3-color LED light source 2, applying +10V as a selective voltage between the electrode film 14a and the external electrode film 14c, and applying 0V to a non-selective location, a uniformly bright display is achieved from the lateral face (display surface 1a) of the waveguide 3. Even at low voltages, it is possible to extract to the outside almost all the incident light of the light source 2, thus achieving a display element 11 with high power efficiency.

A display device can be configured in the same way as the display device 100 by arranging in a row a plurality of the display elements 11 shown in FIG. 4 vertical with respect to the propagation direction of light in the waveguide 3, such that the display surfaces 1a are on the same side, as shown in FIG. 2. The number of pixels when n rows of the display elements 11 are arranged in the row direction of the screen and actuators 14 for m lines are arranged in the direction (line direction) in which the waveguides 3 extend is n×m pixels.

The method for achieving extraction from the lateral face (display surface 1a) of the waveguide 3 to carry out image display is the same as for the display device 100 of Embodiment 1, and therefore will not be further explained. Only the structure of the actuators is different between the display device of Embodiment 1 and the display device of Embodiment 2, and the rest of the structure is substantially the same.

Furthermore, in order to actually operate the display device of Embodiment 2, it is sufficient to provide, as shown in FIG. 3, a light source drive circuit 50 for driving the light sources 2, an actuator drive circuit 51 for driving operating the actuators 14 by applying voltages to the electrode films 14a and 14c, and a control circuit 52 that synchronizes these circuits, inputs signals, and displays images.

Since a light modulation medium is sandwiched between line electrodes and row electrodes in conventional XY matrix-type flat display elements, it was difficult to increase the size of the devices due to the occurrence of crosstalk. However, with the display devices of Embodiment 1 and 2, there is no electrical connection between the drive circuits of the lines and rows, and therefore crosstalk essentially does not occur and, moreover, it is easy to increase the size of devices since the structure is simple. Moreover, since it is not particularly necessary to provide ITO, which requires high temperature processing and because the structure is simple, it is possible to achieve thin flexible display devices that resemble film. Furthermore, LEDs or the like with high light-emission efficiency are used as the light source, and therefore it is possible to achieve high light extraction efficiency with low power actuators, such that power consumption also can be reduced.

As described above, with a display element and a display device according to Embodiment 1 and 2, by using a soft waveguide, it is possible to achieve a innovative display that has a large thin screen capable of being hung or attached on a wall and that has high light emission efficiency and low power consumption.

It should be noted that in embodiments 1 and 2, an example of silicone gel as the core 3a of the waveguide 3 was described, but a transparent material that easily deforms and shows so called rubber elasticity, for example urethane based rubber will achieve the same effect. A material with a Young's modulus smaller than $10^6 N/m^2$ may be used as the core 3a.

Furthermore, in embodiments 1 and 2, the entire core 3a was structured with the same material, but it is sufficient for the surface of the core 3a of the waveguide 3 to be easily deformable, and therefore the surface on the side of the waveguide 3 may be structured with a hard material such as an ordinary plastic while only locations to be deformed are structured as layers arranged by a soft layer. Furthermore, it is also possible to use a waveguide 3 in which only the core 3a is structured without the cladding 3b such that the cladding on both sides is air. Furthermore, to facilitate handling, it is possible to use a waveguide 3 in which cladding is provided on both sides of the core 3a.

It should be noted that in embodiments 1 and 2 a simple matrix type display device was shown in which the waveguides 3 were arrayed according to the number of rows and a plurality of 3-color LED light sources 2 were arranged, but the type of light source and the type of actuator, as well as the structure of the positioning of these is in no way limited to this. Any structure by which it is possible to achieve high extraction efficiency with low power by deforming a soft waveguide 3 may be used. For example, a structure is possible in which the waveguide 3 is made of a single flat sheet with a single light source 2 arranged in an XY matrix with a number of actuators 4 or 14 according to the number of pixels. In this case, an active element that drives the actuators 4 or 14 are added to each actuator and driven for each pixel such that gradation is carried out by controlling the time in which the core deforms. A TFT (thin flat transistor) or a TFD (thin flat diode) may be used as the active element.

With the display element and the display device according to embodiments 1 and 2, the light extraction efficiency is improved in display elements and display devices that use a technique in which light propagated in the waveguide 3 is extracted from the lateral face of the waveguide, which enables greater luminance with reduced power consumption as well as improved uniformity of display. Furthermore, it is possible to achieve sheet-shaped thin display devices regardless of the screen size even for large screens exceeding 100 inches and small screens for mobile applications.

EMBODIMENT 3

Figure 5:
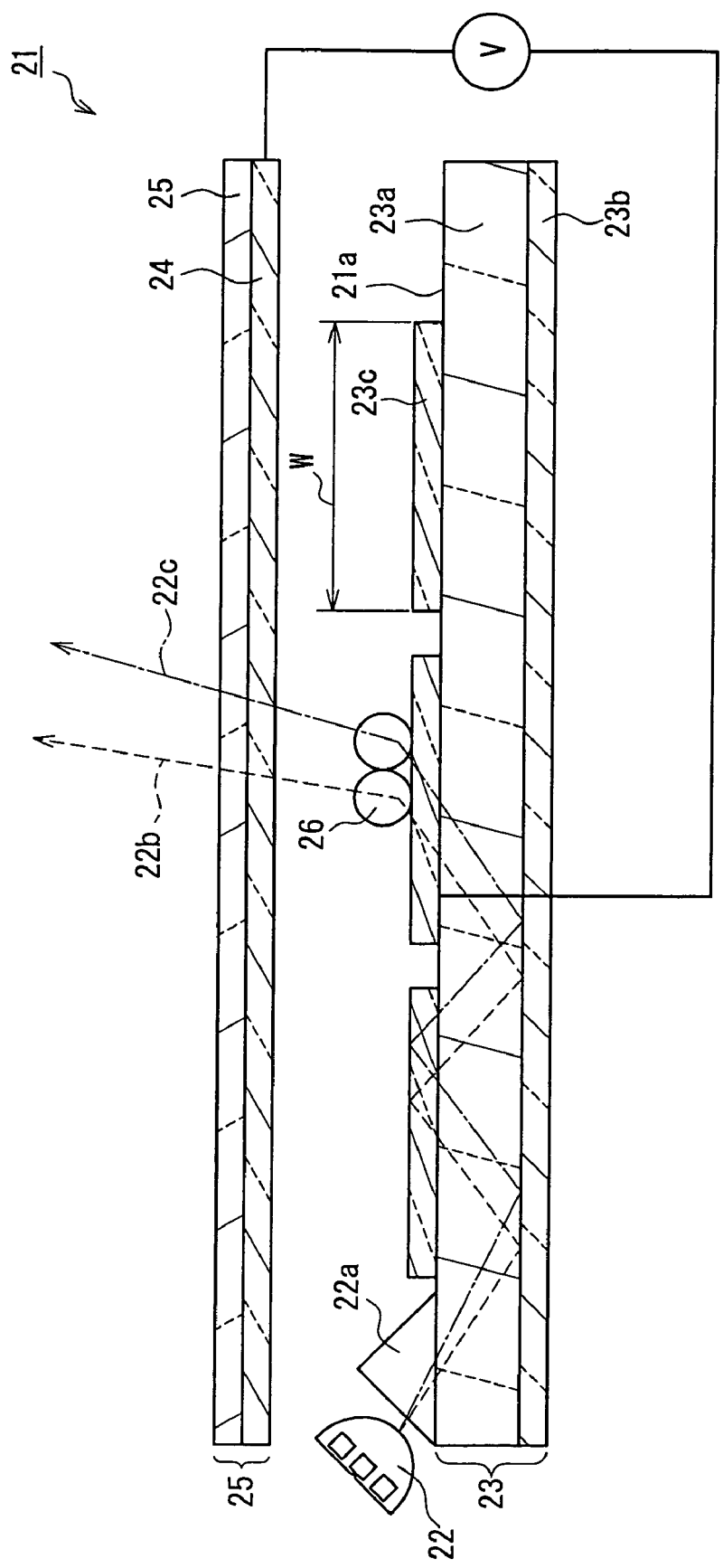
FIG. 5 is a cross-sectional view showing a structure of a display element according to Embodiment 3 of the present invention.

The following is a description of a display element according to Embodiment 3 of the present invention with reference to FIG. 5. FIG. 5 is a cross-sectional view showing a structure of a display element 21 according to Embodiment 3. As shown in FIG. 5, the display element 21 is provided with a light source 22, a waveguide 23, an opposing electrode film 25 that opposes the waveguide 23, and particles 26 arranged near the waveguide 23.

The waveguide 23 is provided with a core 23a that propagates light, a cladding 23b, and waveguide electrode films 23c. A sheet of acrylic resin for example, which is an extremely soft material, with a thickness of 100-μm is used as the core 23a. Furthermore, a transparent fluoric polymer that has a low refractive index is coated as the cladding 23b to a thickness of 10 μm on a surface on one side of the core 23a. The waveguide electrode films 23c are ITO and are attached directly with an adhesive on a surface on the opposite side of the core 23a from the cladding 23b. The cladding 23b is arranged on one surface only of the core 23a and a plurality of the waveguide electrode films 23c are arranged on the reverse surface. The waveguide electrode films 23c are ITO and a plurality of these are arranged in the direction in which the waveguide 23 extends. The length W of the waveguide electrode film 23c in the propagation direction of light in the waveguide 23 is 300 μm for example. The cladding on the opposite side of the cladding 23b is air. Furthermore, the waveguide electrode films 23c are a portion of the core and the light propagated in the waveguide 23 is also totally reflected by the interface of the waveguide electrode films 23c and the air. It should be noted that this also may be a structure in which no cladding 23b is provided.

The light source 22 is arranged at an end portion of the waveguide 23 and the light source 22 is arranged with an orientation such that the light emitted from the light source 22 is coupled into the waveguide 23. It is preferable that a prism 22a is placed and optically coupled at an incident location of the waveguide 23. It should be noted that the light source 22 may be the same as the light source 2 in Embodiment 1 and it is preferable that a 3-color LED is used for example.

A light source 22 that has high directivity is preferable to enable efficient extraction of light from the waveguide 23. In the waveguide 23, the total reflection angle at the interface between the core 23a and the air is 60°. The state of light propagation in the waveguide 23 is shown conceptually in the cross-sectional view of FIG. 5.

When the incident angle (angle with respect to the normal line of the display surface 21a) to the waveguide 23 of the light 22b shown as a broken line emitted from the light source 22 is smaller than 41.8°, which is the critical angle in Embodiment 3, the light 22b leaks from the waveguide 23. Conversely, when the incident angle is greater than the critical angle of 41.8° as with the light 22c shown by the dot-dash line, the travel path of the light 22c is close to parallel to the waveguide 23. In this way, total reflectance occurs repetitively in the core 23a and the waveguide electrode film 23c and the spacing between locations of such total reflectance becomes extremely large such that locations in which light extraction is desired are passed over, thus tending to reduce efficiency and produce uneven luminance. Furthermore, as illustrated in FIG. 3 of JP H7-287176A, the extraction ratio of evanescent waves becomes smaller and efficiency is reduced. For these reasons, it is preferable that the incident angle of light emitted from the light source 22 to the waveguide 23 is larger than the critical angle of 41.8° but close to the critical angle of 41.8° with a light source 22 of high directivity. For example, when the light source 22 is an LED, the directivity can be varied according to the shape of the lens that is molded, and is therefore preferable. That is why, in Embodiment 3, a 3-color LED in which the half value width of the emitted light angle distribution is set to 10° is used as the light source 22.

It should be noted that, other than an LED, it is also possible to use a light source whose directivity has been improved by arranging a micro-lens array on an organic EL panel, as the light source 22, and it is also possible to use a semiconductor laser. By using 3-color LED as the light source 22, it is easier to make light of three colors incident on a single waveguide 23. With conventional displays such as liquid crystal displays and PDPs, a pixel is configured by three sub-pixels of the three primary colors R, G, and B, but by configuring a pixel as described above, it is not necessary to divide the waveguides 23 that extend in the row direction for each color and the three primary colors can be incident on a single waveguide 23. Therefore it is possible to reduce the number of waveguides 23, thus providing the effect of reduced costs.

The opposing electrode film 24 is arranged in opposition to the waveguide 23. The opposing electrode film 24 is ITO for example, and is deposited on a substrate 25 of an acrylic resin. The spacing between the waveguide electrode film 23c and the opposing electrode film 24 is 35 μm for example.

Particles 26 are arranged in the vicinity of the waveguide 23. The particles 26 are positioned between the waveguide electrode film 23c and the opposing electrode film 24, are made of an acrylic resin, and are electrically charged. The mean particle size of the particles 26 is 6 μm for example. The particles 26 are filled into the space between the waveguide electrode film 23c and the opposing electrode film 24 to a filling rate of 20%. It should be noted that the filling rate is the ratio of the volume occupied by the particles per unit of volume. The volume occupied by the particles 26 can be obtained by multiplying the number of particles 26 per unit of volume by the volume per particle that is obtained from the mean particle size of the particles 26.

When applying a voltage of 70V for example so that the selected waveguide electrode film 23c becomes negative and the opposing electrode film 24 becomes positive, the particles 26 contact the surface of the waveguide electrode film 23c. In this way, the particles 26 and the waveguide 23 become integrated. That is, the particles 26 become a portion of a lateral face of the waveguide 23 and the shape of the lateral face of the waveguide 23 on the side of the waveguide electrode film 23c is changed.

Light of a desired color emitted from the light source 22 is propagated in the waveguide 23. Here, by selectively applying voltages to the waveguide electrode film 23c and the opposing electrode film 24, the shape of the lateral face of the waveguide 23 on the side of the waveguide electrode film 23c is changed by the particles 26. By changing the shape of the waveguide 23, the state of propagation changes and the light that has been propagated in the waveguide 23 leaks outside from the waveguide lateral face of the waveguide 23. By setting the refractive index of the particles 26 to approximate the refractive index of the core 23a or the cladding 23b, it is possible to extract light to the outside from the particles 26. It is preferable that the refractive index of the particles 26 for example is substantially equivalent to the refractive index of the core 23a.

In this way, light leaks from the contacting portions of the particles 26 and the waveguide electrode film 23c, and therefore light can be extracted in the direction of the acrylic resin substrate 25 such that the substrate 25 can be made a display screen.

On the other hand, when a voltage of 70V is applied to reverse the electric field, that is, such that the waveguide electrode film 23c becomes positive and the opposing electrode film 24 becomes negative, the particles 26 move away from the waveguide electrode film 23c. For this reason, the light being propagated inside the waveguide 23 cannot be extracted as leaked light and is guided as it is within the waveguide 23, and therefore display is not conducted.

In this way, since light is extracted from the lateral face of the waveguide 23 by bringing individual particles 26 into contact with the waveguide electrode film 23c, the contact surface area is small and it is not necessary to have contact within the entire surface such as with conventional flat shaped piezoelectric elements. For this reason, a very uniform small pressure can be applied to the waveguide 23 and, moreover, the pressure can be applied electrostatically to make control possible. It should be noted that in the above description charged particles 26 were used, but instead of these it is also possible to use particles that are magnetic and to control contact and non-contact of the particles 26 to the surface of the waveguide 23 by controlling a magnetic field between the opposing electrode film 24 and the waveguide electrode film 23c.

Furthermore, particles made of an acrylic resin containing rhodamine, which is a fluorochrome, may be used as the particles 26. In this case, the light extracted from the lateral face of the waveguide 23 when using a green LED that emits a 520 nm wavelength light as the light source 22 was observed to be an orange light with a wavelength of 580 nm. In this way, by selectively using particles 26 that contain a fluorochrome or a fluorescent substance, and an LED light source 22 that corresponds to the excitation wavelength of the fluorochrome or the fluorescent substance, it is possible to extract light of various wavelengths. Furthermore, by using an ultraviolet light LED as the light source 22 and by using the fluorescent substances used in PDPs as the particles 26, it is possible to achieve display of RGB even when using a single color LED as the light source 22.

Figure 6:
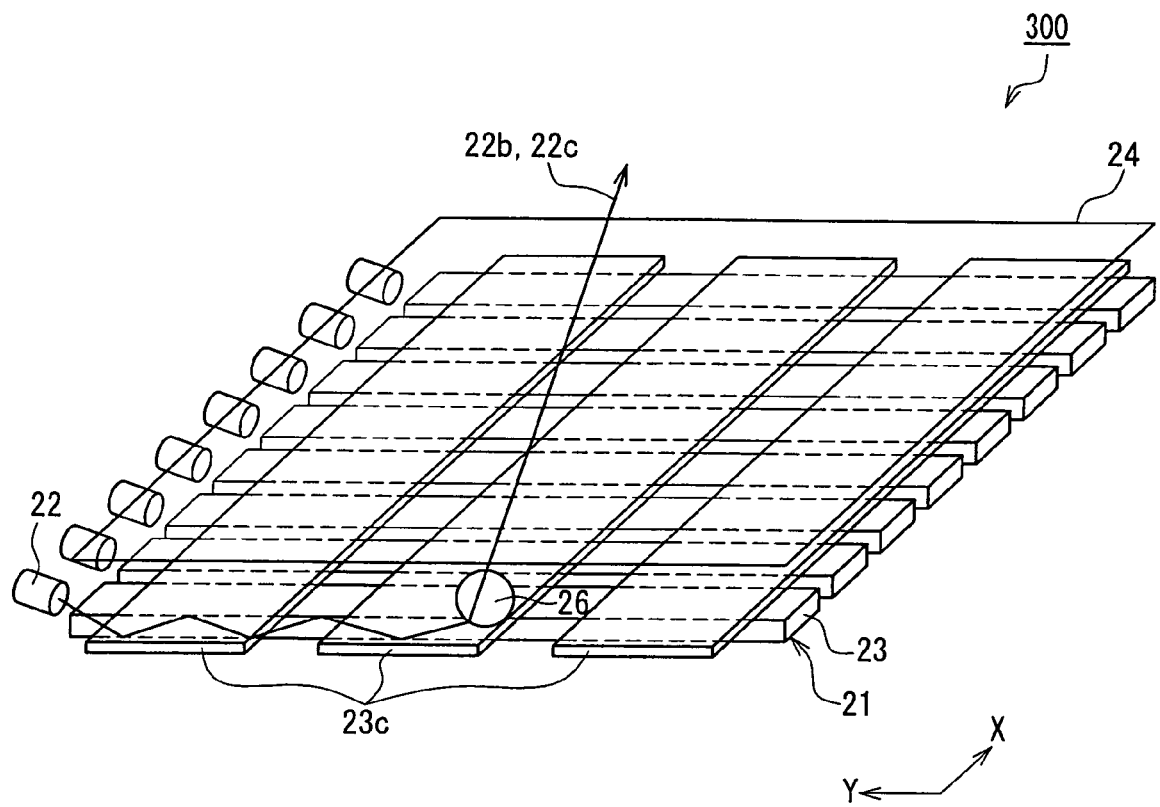
FIG. 6 is a perspective view showing a structure of a display device according to Embodiment 3 of the present invention.

The following is a description of a display device 300 according to Embodiment 3 with reference to FIG. 6. FIG. 6 is a perspective view showing a structure of the display device 300 according to Embodiment 3. The display device 300 can be configured by arranging a plurality of the above-described display elements 21 in a row vertically with respect to the propagation direction of light in the waveguide 23. As shown in FIG. 6, with the display device 300 of Embodiment 3, the waveguides 23 of the display elements 21 are arranged in an array of n rows in the row direction (X direction) of the screen. It should be noted that n is a positive integer. The light sources 22 are arranged respectively at end portions of the waveguides 23. At the lateral face of the waveguide 23, the electrode films 23c for m lines are arranged in the line direction (Y direction), which is the direction in which waveguides 23 extend. The opposing electrode film 24 for the display elements 21 is common and is arranged such that it covers all the waveguides 23 of the display elements 24. Furthermore, also the waveguide electrode films 23c of the same line are shared by the respective waveguides 23 and cover the lines thereof. The number of pixels of the display device 300 is n×m pixels.

With the display device 300 of Embodiment 3, the particles 26 are made to undergo contact or non-contact to the waveguide electrode film 23c by controlling, line by line, the voltages applied between the waveguide electrode film 23c and the opposing electrode film 24 such that light propagated in the waveguide 23 by total reflection is extracted from a lateral face of the waveguide 23 and emitted toward the opposing electrode film 24.

A display device 300 configured in this way is capable of displaying a given image by controlling the application of voltages to the various chips for the 3-color LEDs for the waveguides 23 that extend in the row direction of the display plane (XY plane), based on the color and luminance information of the pixels on the lines for which extraction is selected with the waveguide electrode film 23c and the opposing electrode film 24.

Figure 7:
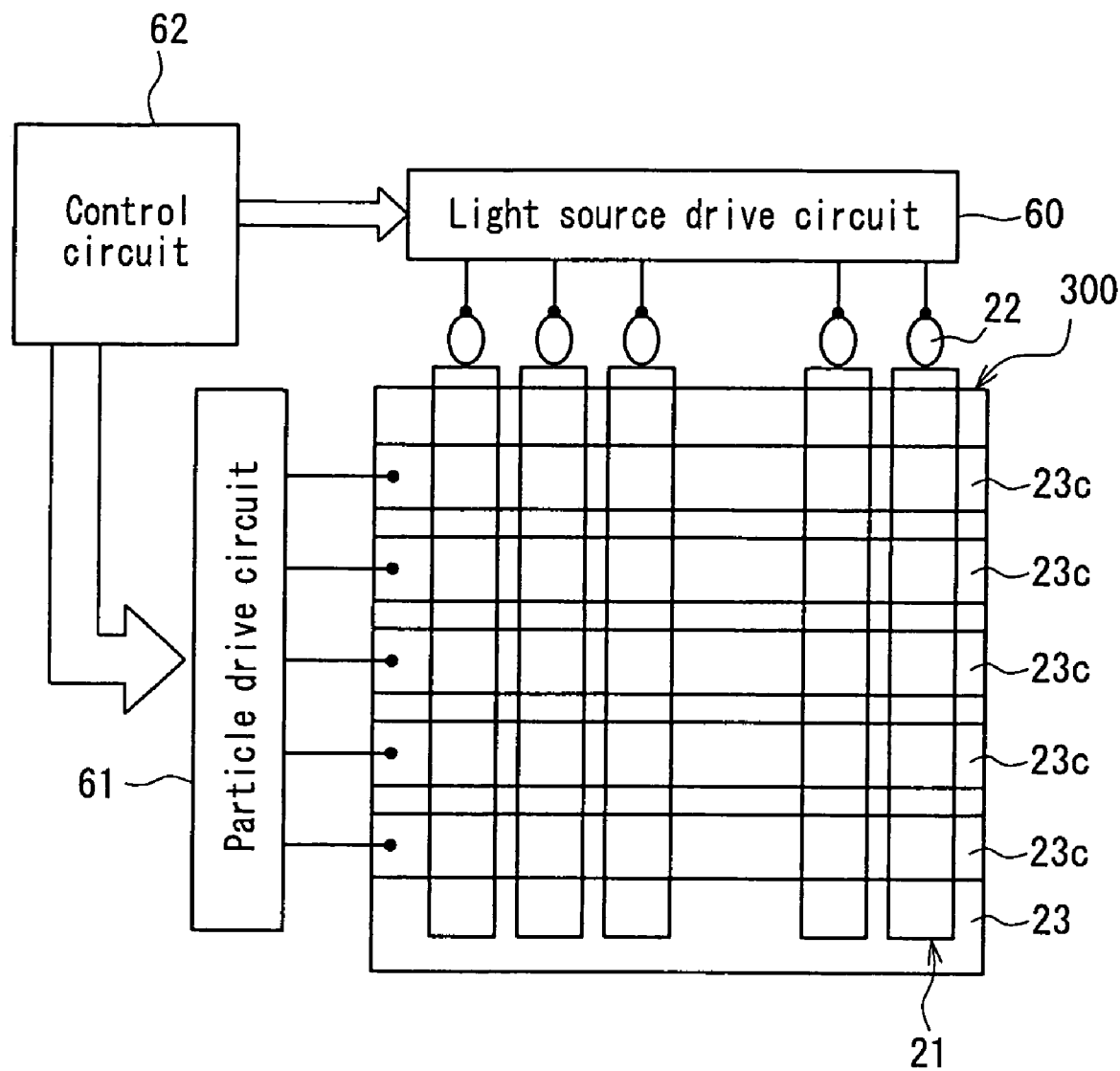
FIG. 7 is a block diagram showing a structure of a display device according to Embodiment 3 of the present invention.

A block diagram showing a configuration of the display device 300 of Embodiment 3 is shown in FIG. 7. FIG. 7 illustrates a specific configuration for actually operating the display device 300. In addition to the above, the display device 300 is provided with a light source drive circuit 60 for driving the light sources 22, a particle drive circuit 61 for making the particles 26 undergo contact or non-contact with the waveguide electrode film 23c by applying voltages to the waveguide electrode film 23c and the opposing electrode film 24, and a control circuit 62 that synchronizes these circuits, inputs signals, and displays images. The control circuit 62 inputs luminance information of the colors RGB of pixels in lines selected by the particle drive circuit 61 to the driver LSI of the light source drive circuit 60, and the light source drive circuit 60 inputs applied voltages corresponding to the luminance information to the light sources 22 to enable full color image display.

Since 3-color LEDs are used as the light sources 22, it is possible to make light of three colors incident on a single waveguide 33. This makes it possible to display light of three colors with a single display element 21, that is, with one line. With conventional display devices such as liquid crystal displays and PDPs, a pixel is configured by three sub-pixels of the three primary colors R, G, and B. However, with the display device using the waveguide 23 of Embodiment 3, it is not necessary to divide the waveguides 23 that extend in the row direction for each color and the three primary colors can be incident on a single waveguide 23. Therefore it is possible to reduce the number of waveguides 23 (display elements 21), thus providing the effect of reduced costs.

EMBODIMENT 4

Figure 8:
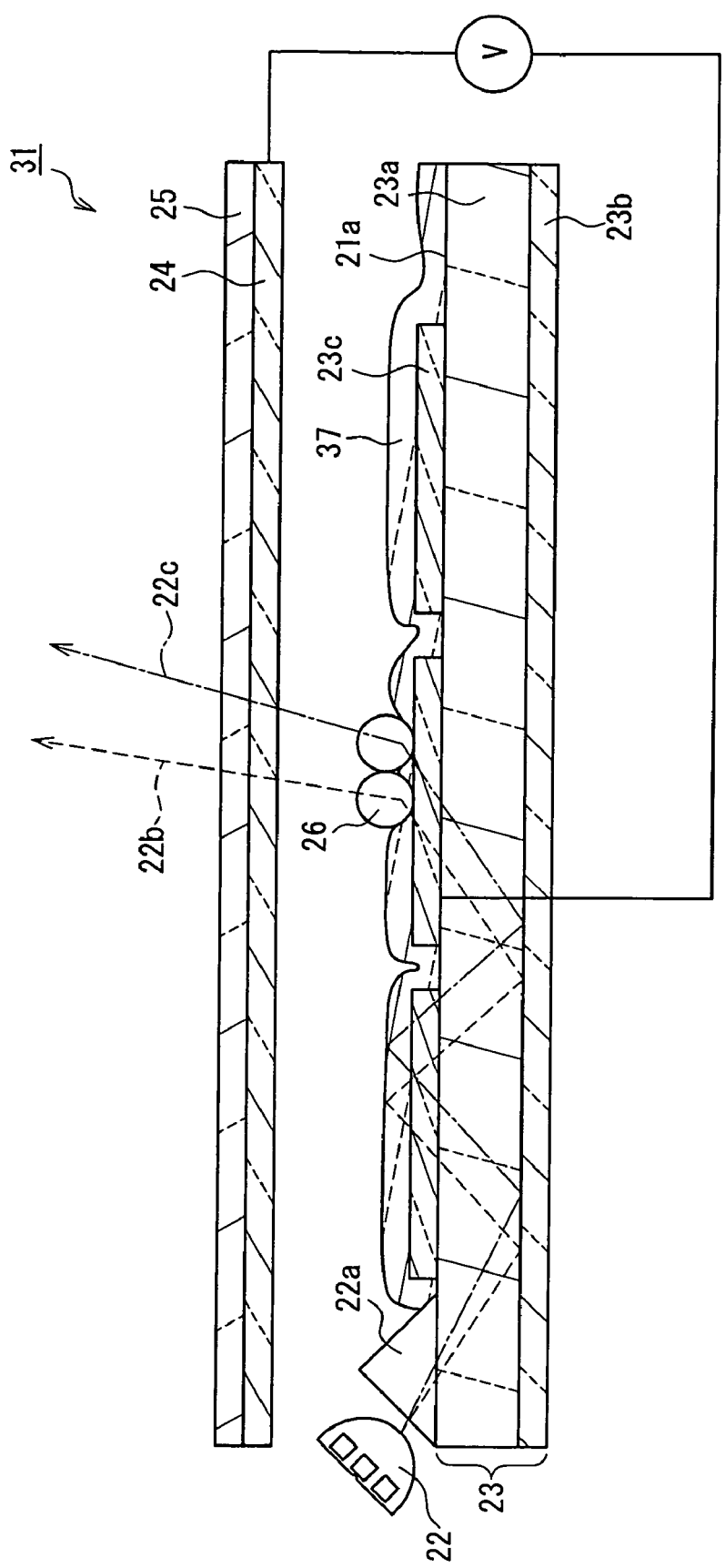
FIG. 8 is a cross-sectional view showing a structure of a display element according to Embodiment 4 of the present invention.

The following is a description of a display element 31 according to Embodiment 4 of the present invention with reference to FIG. 8. The display element 31 according to Embodiment 4 is a structure in which a coating material 37 that has a relatively large surface tension is applied on the waveguide 23 of the display element 21 according to Embodiment 3, on the side on which the waveguide electrode film 23c is arranged. Specifically, the surface tension of the coating material 37 is preferably not less than 50 mN/m. The coating material 37 covers the core 23a and the waveguide electrode film 23c such that the coating material 37 is a portion of the core, and the light propagated in the waveguide 23 is also totally reflected by the interface of the coating material 37 and the air. Since the same function is indicated for portions other than the coating material 37, the same numerical symbols will be used and their further description will be omitted.

The coating material 37 is a glycerin for example with a surface tension of 63.4 mN/m and is applied to have a thickness of approximately 2 μm. Furthermore, it is preferable that a material with a small surface tension is used for the particles 26. Specifically, the surface tension of the particles 26 is preferably not more than 30 mN/m.

A display element 31 was actually formed using the particles 26 made of Teflon (registered trademark) with a surface tension of 18.4 mN/m, for example. The mean particle size of the particles 26 was set at 6 μm and the filling rate of the particles 26 in the space between the waveguide electrode film 23c and the opposing electrode film 24 was set at 20%. A voltage of 50V was applied so that the waveguide electrode film 23c of the selected line became negative and the opposing electrode film 24 became positive. In this way, the particles 26 came in contact with the surface of the waveguide electrode film 23c and the leaked light from the contact portion was extracted toward the substrate 25. On the other hand, a voltage of 50V was applied to reverse the electric field, namely so that the waveguide electrode film 23c became positive and the opposing electrode film 24 became negative. In this way, since the particles 26 move away from the surface of the waveguide electrode film 23c, the light from the light source 22 propagated in the waveguide 23 cannot be extracted as leaked light. In this case, display and non-display can be switched by a small voltage in the display element 31 of Embodiment 4. This is because the surface tension of the glycerin, which is the coating material 37 is sufficiently larger than the surface tension of the Teflon (registered trademark) of the particles 26. In this way, the so called springiness at the contact surface between the particles 26 and the coating material 37 becomes greater. Springiness is a physical phenomenon in which springing occurs without the coating material 37 spreading against surface of the particles 26. That is, the greater the springiness between the particles 26 and the coating material 37, the greater the rebound at contact between the particles 26 and the waveguide electrode film 23c. For this reason, the particles 26 can be made to move away more easily from the waveguide electrode film 23c. Accordingly, contact and non-contact between the particles 26 and the waveguide electrode film 23c can be controlled with a low voltage.

In this way, by providing the coating material 37 with a different surface tension from the particles 26 on the surface of the core 23a and the waveguide electrode film 23c, it is possible to reduce the voltage required to control contact of the particles 26. It should be noted that the surface tension of the particles 26 may be different from the surface tension of the surface of the waveguide 23 (the waveguide electrode film 23c). However, generally the structure is such that the surface tension of the particles 26 is smaller than the surface tension of the surface of the waveguide 23.

A display device can be configured in the same way as the display device 300 by arranging in a row a plurality of the display elements 31 shown in FIG. 8 vertical with respect to the propagation direction of light in the waveguide 23, such that the display surfaces 21a are on the same side, as shown in FIG. 6. When n rows of the display elements 31 are arranged in the row direction of the screen and the waveguide electrode film 23c for m lines are arranged in the direction (line direction) in which the waveguides 3 extend the number of pixels is n×m pixels.

The method for achieving extraction of a desired light from the lateral face (display surface 21a) of the waveguide 23 to carry out image display is the same as for the display device 300 of Embodiment 3, and therefore its explanation will be omitted. A point of difference between the display device of Embodiment 4 and the display device of Embodiment 5 is that the coating material 37 is arranged on a surface of the waveguide 23 and otherwise the structures are substantially the same.

Furthermore, in order to actually operate the display device of Embodiment 4, as shown in FIG. 7, it is possible to provide a light source drive circuit 60 for driving the light sources 22, a particle drive circuit 61 for making the particles 26 undergo contact or non-contact to the waveguide electrode film 23c by applying voltages to the waveguide electrode film 23c and the opposing electrode film 24, and a control circuit 62 that synchronizes these circuits, inputs signals, and displays images.

With the display devices of Embodiment 3 and 4, display of a given image was achieved by controlling the application of voltages to the various chips for the 3-color LEDs serving as the light sources 22 for the waveguides 23 that extend in the row direction of the display plane (XY plane), based on the color and luminance information of the pixels on the lines for which extraction is selected with the waveguide electrode film 23c and the opposing electrode film 24. However, the configuration of the type of light source and the positioning for example is not limited to these. For example, a structure is possible in which the waveguide electrode film 23c and the opposing electrode film 24 are arranged in an XY matrix corresponding to the number of pixels. In this case, each pixel may be driven by connecting an active element to the waveguide electrode film 23c and the opposing electrode film 24. A TFT or a TFD may be used as the active element for example.

With the display element and the display device according to embodiments 3 and 4, the light extraction efficiency is improved by controlling contact of the particles in a display device making use of a technique in which light is guided from an end face of the waveguide and light is extracted from a surface of core of the waveguide, thus making it possible to achieve higher luminance with lower power consumption. Furthermore, the uniformity of display is improved. With embodiments 3 and 4, it is possible to achieve sheet-shaped thin display devices regardless of the screen size even for large screens exceeding 100 inches and small screens for mobile applications.

The present inventors produced a display device in which light is extracted from a waveguide with a structure that is the same as the conventional structure of the previously mentioned "Waveguide Panel Display Using Electromechanical Spatial Modulators," X. Zhou, E. Gulari, SID98 Digest, 1998, pages 1,022 to 1,025. However, it was evident that luminance was low and brightness is increased as thickness is reduced in conventional structures in which the thickness of the waveguide is thicker than the pixel width (width of propagation direction of light).

The reason for this is that the distance between locations of total reflection in the waveguide in which propagated light undergoes repetitive total reflection at the interface between the core and the air is dependent on the thickness of the waveguide. For example, for total reflection at a reflection angle of 45°, the distance between locations of total reflection is double the width of the waveguide. And for this reason the thickness of the waveguide must be not greater than ½ of the width of the pixels in the light propagation direction. If not, the distance between locations of total reflection becomes greater than the pixel width and the reflected light passes over the pixels such that extraction from the waveguide lateral face cannot be achieved.

Accordingly, from the point of view of extraction efficiency, the thickness of the waveguide in the display element of embodiments 1 to 4 is preferably less than ½ of the pixel width and, moreover, in consideration of the angle distribution of the incident light, it is more preferably thinner still. It should be noted that, specifically, the pixel width is the length of the electrodes 4 and 14 in the longitudinal direction of the waveguide 3 in FIGS. 1 and 2 for the display elements of embodiments 1 and 2, and is the length in the longitudinal direction of the waveguide electrode film 23c in FIGS. 5 and 6 for embodiments 3 and 4.

For example, when the thickness of the waveguide 3 and 23 is set at ¼ or less than the pixel width, then light with a reflection angle of 60° or less also becomes extractable. When light of an LED with high directivity is incident on such a waveguide, it is possible to extract almost all the incident light. On the other hand, when the waveguides 3 and 23 are too thin, single mode is approached, at which the angles at which light can be propagated in the waveguide 3 and 23 are limited. This reduces the amount of light that can be transmitted. Moreover, since it becomes difficult to introduce incident light when the waveguide 3 and 23 are too thin, it is preferable that the thickness of the waveguide 3 and 23 are at least 30 µm.

It should be noted that a 3-color laser (RGB) for example may be used for the light sources 2 and 22 of the display elements according to embodiments 1 to 4.

INDUSTRIAL APPLICABILITY

A display element and a display device of the present invention can be used in sheet-shaped thin display devices regardless of the screen size even for large screens and small screens for mobile applications.

The invention claimed is:

1. A display element comprising a light source and a waveguide that propagates a light emitted from the light source, wherein the light propagated in the waveguide is extracted to outside from a waveguide lateral face, and wherein the waveguide comprises a waveguide electrode film on the waveguide lateral face, the display element further comprising an opposing electrode film being opposite to the waveguide electrode film, and particles arranged between the waveguide electrode film and the opposing electrode film, wherein by applying a voltage between the waveguide electrode film and the opposing electrode film, the particles and the waveguide electrode film are brought into contact such that the particles and the waveguide become integrated, changing the shape of the waveguide lateral face and extracting the light out of the waveguide from the waveguide lateral face, and wherein the particles are fluorescent.

2. The display element according to claim 1, wherein the light source emits ultraviolet light.

3. A display device comprising:

the display element according to claim 1, a light source drive circuit for driving the light source, a particle drive circuit for applying a voltage between the waveguide electrode film and the opposing electrode film, and a control circuit that controls the light source drive circuit and the particle drive circuit.

4. A display device comprising:

the display element according to claim 1, the waveguide electrode film and the opposing electrode film being provided for each of a plurality of pixels, and an active matrix element that controls respective voltages between the waveguide electrode films and the opposing electrode films.

5. A display device comprising:

the display element according to claim 2, a light source drive circuit for driving the light source, a particle drive circuit for applying a voltage between the waveguide electrode film and the opposing electrode film, and a control circuit that controls the light source drive circuit and the particle drive circuit.

* * * * *